United States Patent

Hijikata et al.

[11] Patent Number: 5,864,537
[45] Date of Patent: Jan. 26, 1999

[54] MEDIA INFORMATION DISTRIBUTION SERVICES SYSTEM AND METHOD

[75] Inventors: Toshiyuki Hijikata; Tetsuo Tachibana; Toshio Irie; Tatsuru Nakagaki; Masayuki Yamanaka; Katsutoshi Inoko; Takashi Hatano, all of Kanagawa, Japan

[73] Assignee: Fujitsu Limited, Kanagawa, Japan

[21] Appl. No.: 604,119

[22] Filed: Feb. 20, 1996

[30] Foreign Application Priority Data

Mar. 20, 1995 [JP] Japan ................................. 7-060486

[51] Int. Cl.⁶ ....................................................... H04J 3/16
[52] U.S. Cl. ......................... 370/235; 370/399; 370/422; 370/465; 348/7; 348/13
[58] Field of Search ................................... 370/465, 225, 370/228, 237, 395–399, 422, 235; 348/6, 7, 12, 13, 388

[56] References Cited

U.S. PATENT DOCUMENTS

| | | | |
|---|---|---|---|
| 5,539,448 | 7/1996 | Verhille et al. ........................ | 348/6 |
| 5,555,244 | 9/1996 | Gupta et al. .......................... | 370/397 |
| 5,633,810 | 5/1997 | Mandal et al. ........................ | 370/431 |
| 5,673,290 | 9/1997 | Cioffi .................................... | 375/260 |
| 5,699,362 | 12/1997 | Makam ................................ | 370/437 |

Primary Examiner—Min Jung
Attorney, Agent, or Firm—Helfgott & Karas, P C.

[57] ABSTRACT

A media information distribution service system, such as a video-on-demand service system, is disclosed which, even if the capacity of a line is small and the number of lines connected to a media server, such as a video server, has to be increased accordingly, permits an uneconomical increase in the number of line circuits in the media server to be checked. In the system, a subscriber group that a distributor accommodates can be associated with a plurality of distributor-side paths on a distributor-side line. Each of the distributor-side paths is connected to a respective one of server-side paths on separate server-side lines connecting the media server and an exchange. In sending media information to a subscriber group, an in-server path control unit installed in the media server is permitted to select a free one out of server-side paths on server-side lines allocated for that subscriber group and activates a line interface corresponding to the free server-side path.

21 Claims, 9 Drawing Sheets

VIDEO SERVER MANAGEMENT TABLE

| SUBSCRIBER | DISTRIBUTOR | VCI | VPI | LINE |
|---|---|---|---|---|
| #0<br>#1<br>.<br>.<br>#23 | #1 | 0<br>1<br>.<br>.<br>23 | 10 | #1<br>#2 |
| #24<br>#25<br>.<br>.<br>#47 |  | 24<br>25<br>.<br>.<br>47 | 11 | #1<br>#2 |
| #0<br>#1<br>.<br>.<br>#23 | #2 | 0<br>1<br>.<br>.<br>23 | 20 | #1<br>#2 |
| #24<br>#25<br>.<br>.<br>#47 |  | 24<br>25<br>.<br>.<br>47 | 21 | #1<br>#2 |

FIG. 7A

ATM EXCHANGE MANAGEMENT TABLE

| LINE (OUT) | VPI | LINE (IN) | VPI |
|---|---|---|---|
| #1 | 00 | #1 | 10 |
| #1 | 02 | #2 | 10 |
| #2 | 03 | #1 | 11 |
| #2 | 05 | #2 | 11 |
| #3 | 00 | #1 | 20 |
| #3 | 02 | #2 | 20 |
| #4 | 03 | #1 | 21 |
| #4 | 05 | #2 | 21 |

FIG. 7B

DISTRIBUTOR MANAGEMENT TABLE

| SUBSCRIBER | VCI | VPI | LINE |
|---|---|---|---|
| #0<br>#1<br>.<br>.<br>#23 | 0<br>1<br>.<br>.<br>23 | 00<br>02 | #1<br>(#3) |
| #24<br>#25<br>.<br>.<br>#47 | 24<br>25<br>.<br>.<br>47 | 03<br>05 | #2<br>(#4) |

FIG. 7C

MEDIA INFORMATION DISTRIBUTION SERVICES SYSTEM AND METHOD

BACKGROUND OF THE INVENTION

1. Field of the Invention

The present invention relates to a system for setting up paths for implementing a media information distribution service, such as a video-on-demand service, using a broadband exchange technology such as a broadband-integrated services digital network (B-ISDN).

2. Description of the Related Art

A two-way broadband service, such as a video-on-demand system which enables subscribers to watch video on demand, is now being implemented using a B-ISDN broadband exchange technology.

FIG. 1 shows a general configuration of such a two-way broadband service system.

In a central office 701, a video server 702 which provides video services is connected to an ATM (Asynchronous Transfer Mode) exchange 703 by a line 707. To the ATM exchange 703 is connected by a line 708 a distributor 704, which concentrates subscribers' lines 709.

Digital image data output, placed in ATM cells, from the video server 702 is transmitted to set top boxes (STB) 705 via line 707, ATM exchange 703, line 708, distributor 704, and subscribers' lines 709 in the order mentioned.

The STB 705 converts digital image data into a television signal and then supplies it to a television monitor (TV) 706 to display video.

On the other hand, control information on a video program selection made by a subscriber is transferred from the STB 705 to the distributor 704 over the subscribers's line 709. Then, the distributor 704 transfers the control information to the video server 702 via an ethernet 710. Next, the video server 702 responds to the control information to send digital image data corresponding to the video program the subscriber desires to that subscriber. Response data is transferred from the video server 702 to the STB 705 via the ethernet 710, distributor 704, and subscribers's line 709.

At this point, as a path for communicating image information to a subscriber, a virtual path must be set up between the ATM exchange 703 and the video server 702 and between the ATM exchange 703 and the distributor 704 using a VPI (Virtual Path Identifier) and a VCI (Virtual Channel Identifier) defined in ATM cell headers.

Path setup systems include an SVC (Signaling Virtual Channel) system in which a path is set up at a subscribers's request and a PVC (Permanent Virtual Channel) system in which a path is set up on a fixed basis at provisioning time (at the start of service).

In the SVC system, at the setup of a path in the ATM exchange, control information is exchanged among the ATM exchange 703, the video server 702, and the distributor 704 as requested by a subscriber, thereby permitting a path to be set up between the ATM exchange 703 and the video server 702 and between the ATM exchange 703 and the distributor 704. If, therefore, a number of requests for video-on-demand service is made simultaneously by subscribers, then control information traffic and equipment transactions will increase, resulting in poor response times.

In the PVC system, on the other hand, a PVC for video-on-demand service is established between the ATM exchange 703 and the video server 702 by allocating a predetermined VPI to the line 707 between the ATM exchange 703 and the video server 702, and a PVC for video-on-demand service is also established between the ATM exchange 703 and the distributor 704 by allocating a predetermined VPI to the line 708 between the ATM exchange 703 and the distributor 704. The video server 702 appends that predetermined VPI allocated to the line 707 and a VCI by each subscriber to ATM cells and then sends them onto the line 707. The ATM exchange 703 replaces the predetermined VPI allocated to the line 707 in the ATM cells with the predetermined VPI allocated to the line 708 and then sends the ATM cells over the line 708. The distributor 704 receives ATM cells to which the predetermined VPI allocated to the line 708 is appended and then sends the ATM cells over a subscribers's line 709 corresponding to the VCI appended to the ATM cells.

In the above-described PVC system, ATM cell processing units 801, installed in the video server 702 shown in FIG. 2 to convert digital image data read from a disk storage unit 802 into ATM cells and send them over the line 707, have a limit on their number that is connectable to one line 707 because of limited line capacity. In order to provide video-on-demand service to many subscribers, therefore, it is required to install a plurality of lines 707 (in FIG. 2 two lines: #1 and #2) and connect n number of ATM processors 801 and one disk storage unit 802 to each of the lines. On the other hand, a plurality of distributors 704 may also be needed to accommodate many subscribers, in which case the number of lines 708 required also increases with the number of distributors 704. In addition, as shown in FIG. 2, a plurality of lines 708 may be connected to each of the distributors 704 (in FIG. 2 two lines: #1 and #2, or #3 and #4).

On this assumption, in the prior art, the distributor 704 accommodates a set of subscriber groups and each subscriber group is allocated a set of PVC (VPI) on the line 708 and a PVC (VPI) on the line 707. That is, the distributor 704 allocates only ATM cells received over the line 708 and appended with a predetermined VPI to a subscriber group and only ATM cells received over the line 708 and appended with another predetermined VPI to another subscriber group. Note that each subscriber in each subscriber group is identified by a VCI appended to each ATM cell.

For example, in the prior art, VPI=10 on the line 707 (#1) connected to the video server 702 is connected to VPI=0 on the line 708 (#1) connected to the distributor 704 (#1) by the ATM exchange 703 as shown in FIG. 3. The distributor 704 (#1) allocates only VPI=0 on the line 708 (#1) to a subscriber group comprised of subscribers #0 to #23 for example.

Likewise, VPI=11 on the line 707 (#1) connected to the video server 702 is connected to VPI=1 on the line 708 (#2) connected to the distributor 704 (#1) by the ATM exchange 703. The distributor 704 (#1) allocates only VPI=1 on the line 708 (#2) to a subscriber group comprised of subscribers #24 to #47 for example.

On the other hand, VPI=20 on the line 707 (#2) connected to the video server 702 is connected to VPI=0 on the line 708 (#3) connected to the distributor 704 (#2) by the ATM exchange 703. The distributor 704 (#2) allocates only VPI=0 on the line 708 (#3) to a subscriber group comprised of subscribers #0 to #23 for example.

Likewise, VPI=21 on the line 707 (#2) connected to the video server 702 is connected to VPI=1 on the line 708 (#4) connected to the distributor 704 (#2) by the ATM exchange 703. The distributor 704 (#2) allocates only VPI=1 on the line 708 (#4) to a subscriber group comprised of subscribers #24 to #47 for example.

The possibility of simultaneous requests for video-on-demand service by all the subscribers is considered to be very low. It is thus uneconomical to install in the video server 702 as many ATM cell processing units 801 as there are subscribers. In general, the number of the ATM cell processing units 801 connected to the two lines 707 is set, within the limit determined by the line capacity, equal to the number obtained by multiplying the total number of subscribers allocated to the two lines 707 by the percentage obtained by adding the average percentage of subscribers who may simultaneously make requests for video-on-demand service and the deviation from the average.

As an example, assumes that, in the example of FIG. 3, the total number of subscribers allocated to the two lines 707 is 96, the average of the percentage of subscribers who simultaneously make requests for video-on-demand service is 50%, and the deviation from the average is 10%. Then, the number of ATM cell processing units 801 required for the two lines 707 will be $$96 \times (50\% + 10\%) \approx 58$$

Statistically it is known that the smaller the total number of subscribers allocated to one line 707 is, the greater the deviation from the average (in the above example, 10%) becomes. In the prior art described previously, the total number of subscribers that are allocated to one line 707 is 48.

If, therefore, all 96 subscribers could be allocated to one line 707, then the deviation from the average would be, say, about 5%. In this case, the number of ATM cell processing units 801 required would be $$96 \times (50\% + 5\%) \approx 53$$

Thus, the number of ATM cell processing units 801 required in the entire video server 702 in the case where all 96 subscribers are allocated to two lines 707 becomes larger than in the case where it is assumed that all 96 subscribers can be allocated to one line 707. That is, the prior art suffers from a problem that, when the capacity of one line 707 is small and the number of lines 707 connected to the video server 702 has to be increased accordingly, the number of ATM cell processors 801 required in the video server will also increase.

SUMMARY OF THE INVENTION

The object of the present invention is to, even when the capacity of one line is small and the number of lines connected to a media server, such as a video server, has to be increased accordingly, avoid an uneconomical increase in the number of line circuits in the media server.

According to the present invention, in sending media information to a subscriber group a media server is permitted to select a free one out of server-side paths on server-side lines allocated to the subscriber group.

Thus, in the present invention, it becomes possible to allocate more subscribers to each of server-side lines connected to the media server than with the prior art and make the deviation from the average percentage of subscribers who may make simultaneous requests for media service smaller than with the prior art.

As a result, the total number of line interfaces required to send media information over each server-side line can be decreased in comparison with the prior art, permitting a reduction in hardware scale of the media server to be achieved.

The present invention supposes a media information distribution service system in which media information output from a media server is distributed to subscribers via an exchange and a distributor connected with the exchange.

First, using a free server-side path of server-side paths allocated to server-side lines between the media server and the exchange for a subscriber group that the distributor accommodates, an in-server path control unit installed in the media server sends media information bound for the subscriber group to a line interface connected to a server-side line 105 to which that free server-side path 106 is allocated.

Next, an in-exchange path control unit installed in the exchange connects each of the server-side paths allocated to the respective server-side lines for the subscriber group to a respective one of distributor-side paths allocated to a distributor-side line between the distributor and the exchange for the subscriber group.

Finally, an in-distributor path control unit installed in the distributor distributes to the subscriber group media information received over the distributor-side paths allocated to the distributor-side line for the subscriber group.

Note here that the distributor-side paths for the subscriber group are identified, for example, by virtual path identifiers each of which is appended to media information and has an equal low-order bit value.

In the present invention, a subscriber group that the distributor accommodates can be associated with a plurality of distributor-side paths on the distributor-side line, each of which is connected to a respective one of the server-side paths on separate server-side lines connecting the media server and the exchange.

In sending media information to a subscriber group, the in-server path control unit is permitted to select a free one out of the server-side paths on the server-side lines allocated for that subscriber group and activates the corresponding line interface.

In the present invention, by the above configuration the total number of subscribers allocated to each of the server-side lines can be made larger than that in the prior art and the deviation from the average percentage of subscribers who may make simultaneous requests for media service can be made smaller than that in the prior art.

Consequently, the total number of the line interfaces required to send media information over the respective server-side lines can be made smaller than that in the prior art, permitting the hardware scale of the media server to be reduced.

BRIEF DESCRIPTION OF THE DRAWINGS

The present invention will be more apparent from the following description, when taken in conjunction with the accompanying drawings, in which:

FIG. 7A shows a management table in the video server of FIG. 5;

FIG. 7B shows a management table in the ATM exchange;

FIG. 7C shows a management table in the distributor of FIG. 6;

DETAILED DESCRIPTION OF THE PREFERRED EMBODIMENT

Figure 1:
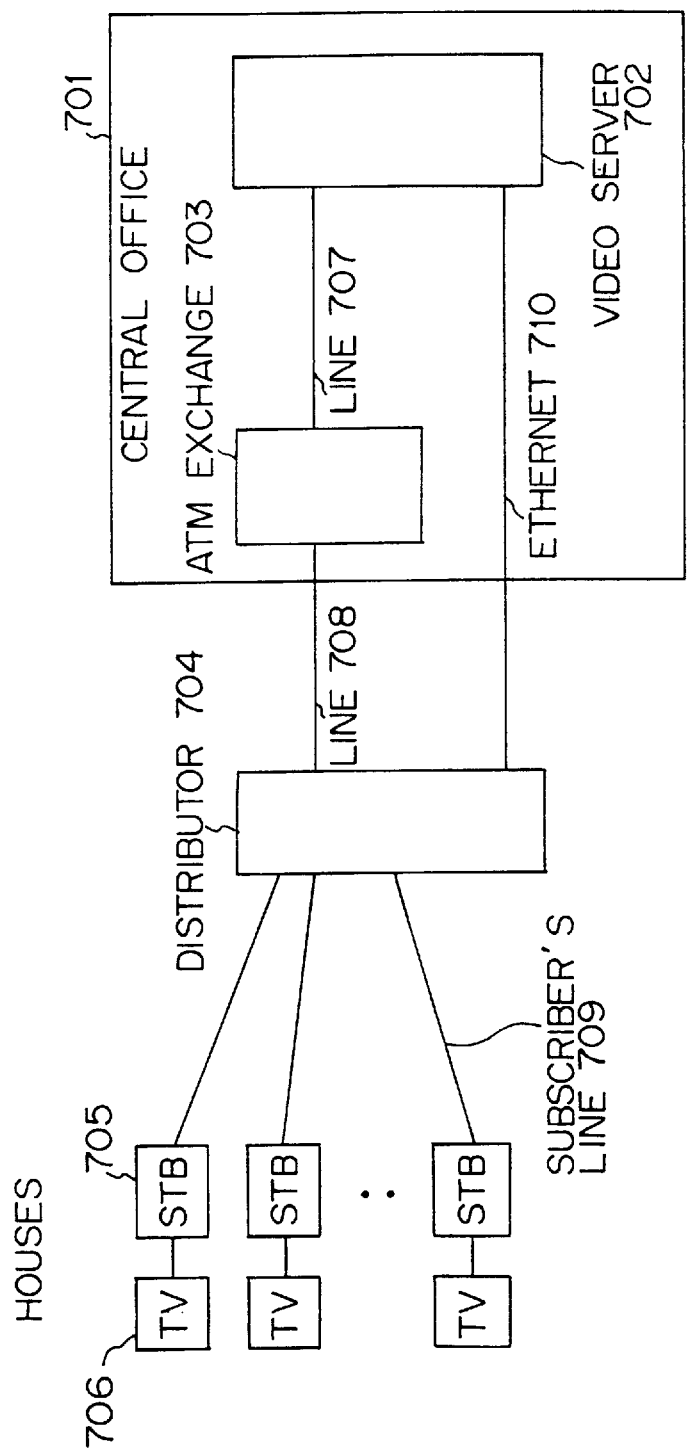
FIG. 1 shows a general configuration of a two-way broadband service system.
Figure 4:
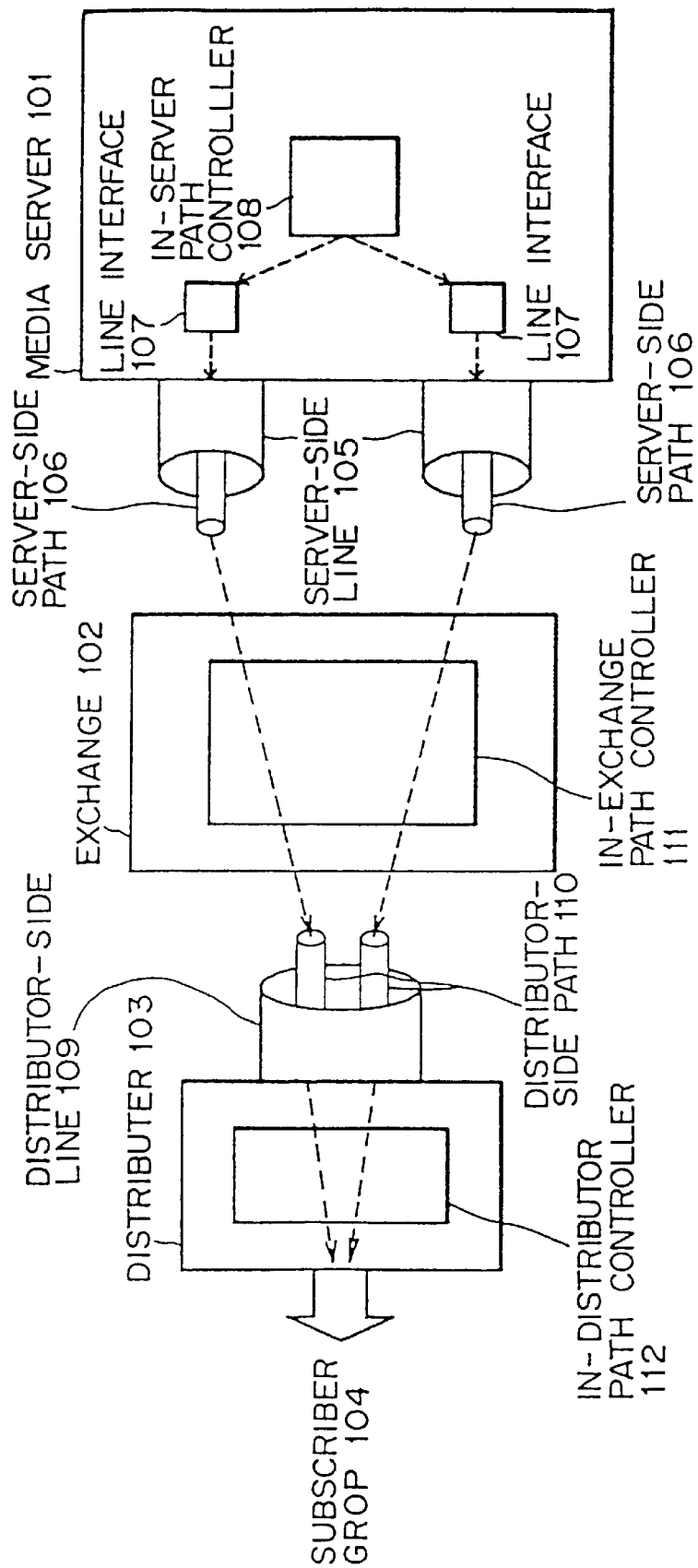
FIG. 4 is a schematic block diagram of a media information distribution system of the present invention.

First, it should be noted that the overall configuration of a two-way broadband service system of the present invention is the same as that previously described in conjunction with FIG. 1. Referring now to FIG. 4, there is shown, in block diagram form, a system of the present invention.

The present invention supposes a media information distribution service system in which media information output from a media server 101 is distributed to subscribers via an exchange 102 and a distributor 103.

First, using a free server-side path 106 (path on the server side) of server-side paths 106 each allocated to respective individual server-side lines 105 between the media server 101 and the exchange 102 for a subscriber group 104 that the distributor accommodates, an in-server path control unit 108 installed in the media server 101 sends media information bound for the subscriber group 104 to a line interface 107 connected to a server-side line 105 to which that free server-side path 106 is allocated.

Next, an in-exchange path control unit 111 installed in the exchange 102 connects each of the server-side paths 106 allocated to the respective server-side lines 105 for the subscriber group 104 to a respective one of distributor-side paths 110 allocated to a distributor-side line 109 between the distributor 103 and the exchange 102 for the subscriber group 104.

Finally, an in-distributor path control unit 112 installed in the distributor 103 distributes to the subscriber group 104 media information received over the distributor-side paths 110 allocated to the distributor-side line 109 for the subscriber group 104.

Note here that the distributor-side paths 110 for the subscriber group 104 are identified, for example, by virtual path identifiers which are appended to media information and have their respective low-order bits set to an equal value.

In the present invention, a set of subscriber groups 104 accommodated by the distributor 103 can be associated with a plurality of distributor-side paths 110 on the distributor-side line 109, each of which is connected to a respective one of the server-side paths 106 on separate server-side lines 105 connecting the media server 101 and the exchange 102.

In sending media information to a subscriber group 104, the in-server path control unit 108 is permitted to select a free one out of the server-side paths 106 on the server-side lines 105 allocated for that subscriber group 104 and activates the corresponding line interface 107.

In the present invention, by the above configuration the total number of subscribers allocated to each of the server-side lines 105 can be made larger than that in the prior art and the deviation from the average percentage of subscribers who may make simultaneous requests for media service can be made smaller than that in the prior art.

Consequently, the total number of the line interfaces 107 required to send media information over the respective server-side lines 105 can be made smaller than that in the prior art, permitting the hardware scale of the media server 101 to be reduced.

The present embodiment is characterized in that a subscriber group the distributor 704 accommodates can be associated with a plurality of PVCs (VPIs) on the line 708, and each of the PVCs (VPIs) on the line 708 for a subscriber group is connected to PVCs (VPIs) on separate lines 707.

Figure 5:
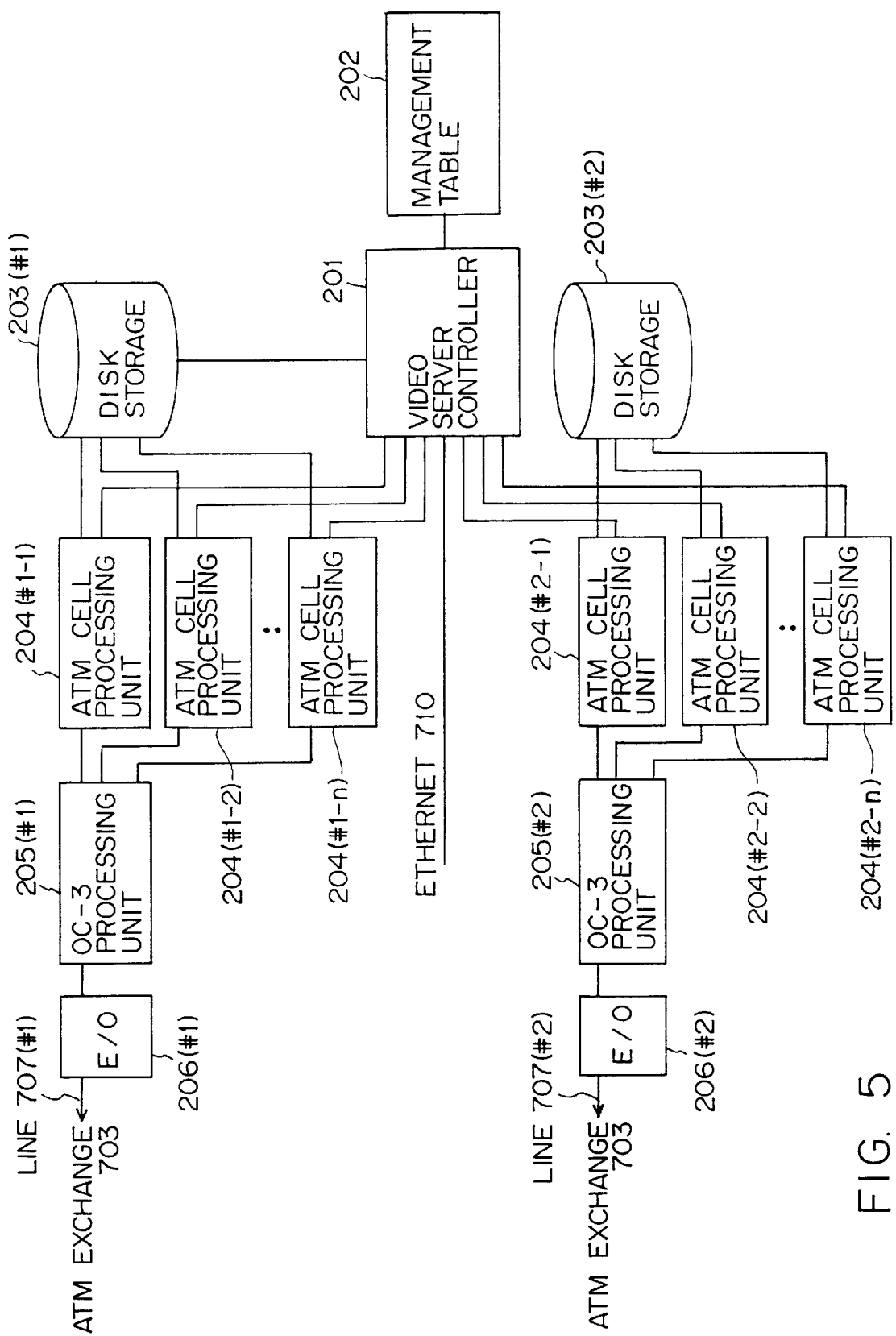
FIG. 5 is a block diagram of a video server embodying the present invention.

FIG. 5 is a block diagram of the video server 701 of FIG. 1 according to an embodiment of the present invention, in which the data structure in a management table 202 is specially related to the invention.

First, a video server controller 201 is connected to the ethernet 710 of FIG. 1 and receives video program selection control information sent by a subscriber over STB 705, subscribers's line 709, distributor 704 and ethernet 710. Then, the video server controller 201 responds to the control information to activate an ATM cell processing unit 204 which is connected to either line 707 (#1) or line 707 (#2) and which is free and instruct a disk storage unit 203 to read selected digital image data to that ATM cell processing unit. At this point, the video server controller refers to the management table 202 and sets up a VPI and a VCI for that subscriber on the ATM cell processing unit 204.

In this case, it is a feature related to the present invention that, as requested by a subscriber, the video server controller 201 can select a free one from among ATM cell processing units 204 which are connected to either the line 707 (#1) or the line 707 (#2). In contrast, in the prior art, a subscriber is merely permitted to select a free one from among ATM cell processors 204 which are connected to a predetermined one of the line 707 (#1) and the line 707 (#2).

ATM cell processing units 204, an STS-3 (OC-3) (Synchronous Transport Signal (Optical Carrier Level 3) processing unit 205 and an E/O (Electrical/Optical) unit 206 are provided for each line 707 (#1 or #2). In FIG. 5, the first numeral with # enclosed in parentheses after each reference numeral corresponds to #1 or #2 line 707.

For each of the #1 and #2 lines 707 there are installed n ATM cell processing units 204: #1-1 to #1-n and #2-1 to #2-n. Each of the ATM cell processing units 204 stores digital image data sequentially read out from the disk storage unit 203 in the form of ATM cells along with specified VPI/VCI and then sends the ATM cells to the STS-3(OC-3) processing unit 205.

The STS-3(OC-3) processing unit 205 multiplexes ATM cell streams output from the ATM cell processing units 204 in accordance with a data format called STS-3(OC-3) and then outputs the resulting multiplexed electric signals to the E/O unit 206.

The E/O unit 206 converts the multiplexed electric signals into light information for transmission over the line 707 of FIG. 1 formed of optical fibers.

Figure 6:
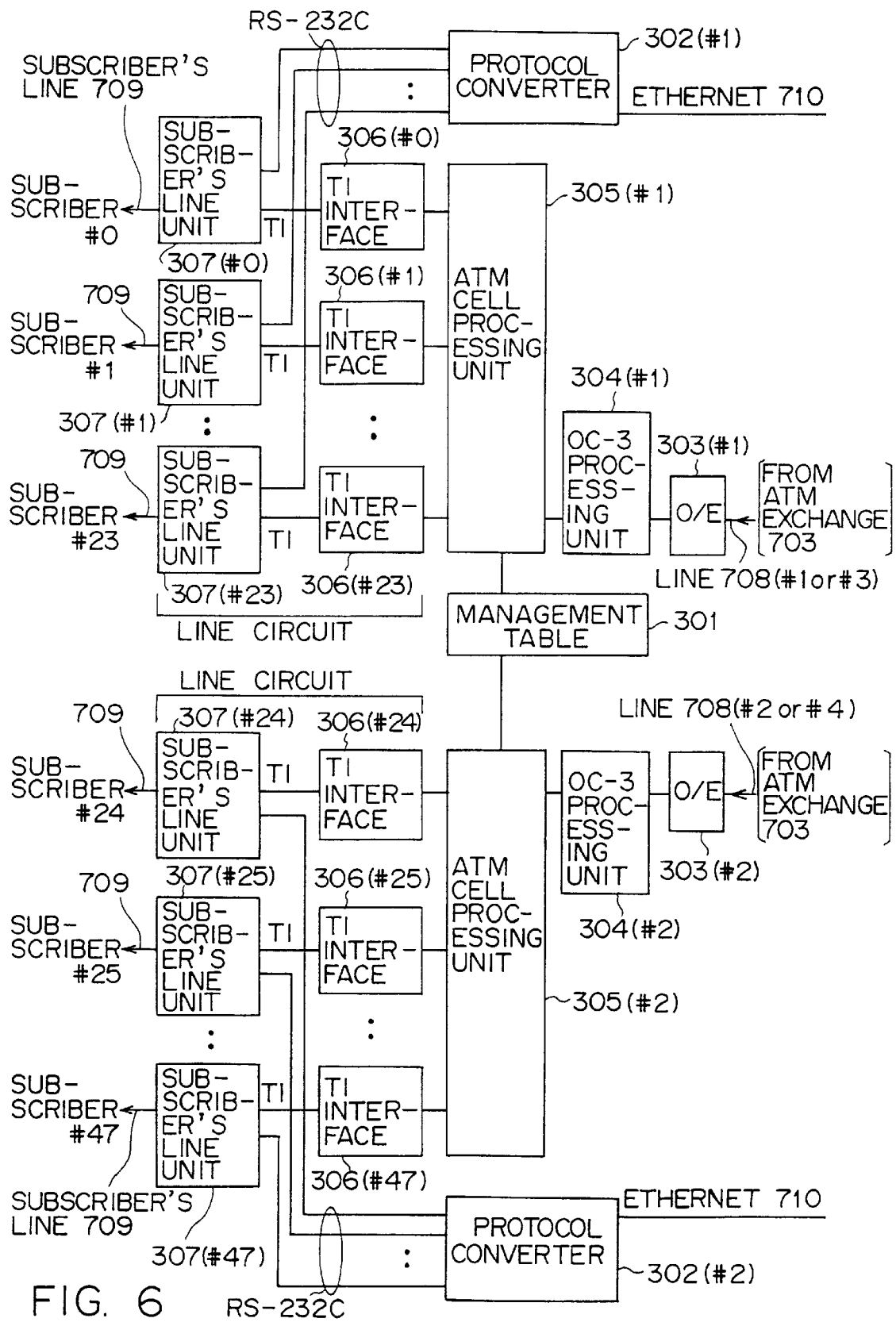
FIG. 6 is a block diagram of a distributor embodying the present invention.

Next, FIG. 6 shows an arrangement of the distributor 704 of FIG. 1 according to an embodiment of the present invention. In this arrangement, it is the data structure of a management table 301 that is specially related to the present invention.

An O/E (Optical/Electrical) unit 303, an STS-3(OC-3) processing unit 304 and an ATM cell processing unit 305 are provided for each of the #1 and #2 (or #3 and #4) lines 708. In FIG. 6, the first numeral with # enclosed in parentheses after each reference numeral indicates the #1 or #2 (or #3 or #4) line 708. For each of subscribers #0 to #23, to the ATM cell processing unit 204 (#1) are connected a T1 interface 306, a subscribers's line circuit 307 and a subscribers's line 709 in cascade. For each of subscribers #24 to #47, a T1 interface 306, a subscribers's line circuit 307 and a subscribers's line 709 are likewise connected in cascade to the ATM cell processing unit 204 (#2).

The O/E unit 303 converts light information transmitted over the line 708 of FIG. 1 formed of optical fibers into electrical signals and provides them to the STS-3(OC-3) processing unit 304.

The STS-3(OC-3) processing unit 304 terminates STS-3 (OC-3) frames contained in electrical signals output from the O/E unit 303 and then provides the resulting ATM cell stream to the ATM cell processing unit 305.

While referring to the management table 301, the ATM cell processing unit 305 outputs digital image data in each ATM cell to a T1 interface 306 on the basis of the VPI/VCI stored in that ATM cell. It is a feature related to the present invention that the ATM cell processing unit 204 associates a plurality of VPIs with the subscriber group comprised of subscribers #0 to #23.

The T1 interface 306 converts the digital image data into a T1 signal that conforms to a data format called T1 and then provides it to the subscribers's line circuit 307.

The subscribers's line circuit 307 provides the T1 signal output from the T1 interface 306 to the subscribers's line 709.

On the other hand, control information for video program selection that the subscribers's line circuit 307 receives from a subscriber via the STB 705 and the subscribers's line 709 is output from the subscribers's line circuit 307 to a protocol converter 302 as a serial signal that meets RS-232C standards.

The protocol converter 302 converts the serial signal into ethernet frames and sends them over the ethernet 710 toward the video server controller 201 of FIG. 5.

Conversely, ethernet frames in which response data received from the video server controller 201 over the ethernet 710 is stored are converted by the protocol converter 302 into an RS-232C standard serial signal, which is then output to the corresponding subscribers's line circuit 307.

The subscribers's line circuit 307 multiplexes the serial signal and the T1 signal output from the T1 interface 306 together and then transmits the multiplexed signal to the subscriber over the subscribers's line 709.

Hereinafter, the operation of the embodiment thus configured will be described with reference to FIGS. 7A, 7B and 7C, and FIGS. 8 and 9.

FIG. 7A shows the data structure of the management table 202 which is installed in the video server 702 as shown in FIG. 5.

Basically, VPI=10 is allocated to a subscriber group comprised of subscribers #0 to #23 that the distributor 704 (#1) accommodates, VPI=11 is allocated to a subscriber group comprised of subscribers #24 to #47 that the distributor 704 (#1) accommodates, VPI=20 is allocated to a subscriber group comprised of subscribers #0 to #23 that the distributor 704 (#2) accommodates, and VPI=21 is allocated to a subscriber group comprised of subscribers #24 to #47 that the distributor 704 (#2) accommodates.

Each of the subscribers #0 to #47 within each distributor is identified by a VCI having a value in the range 0 to 47.

Figure 8:
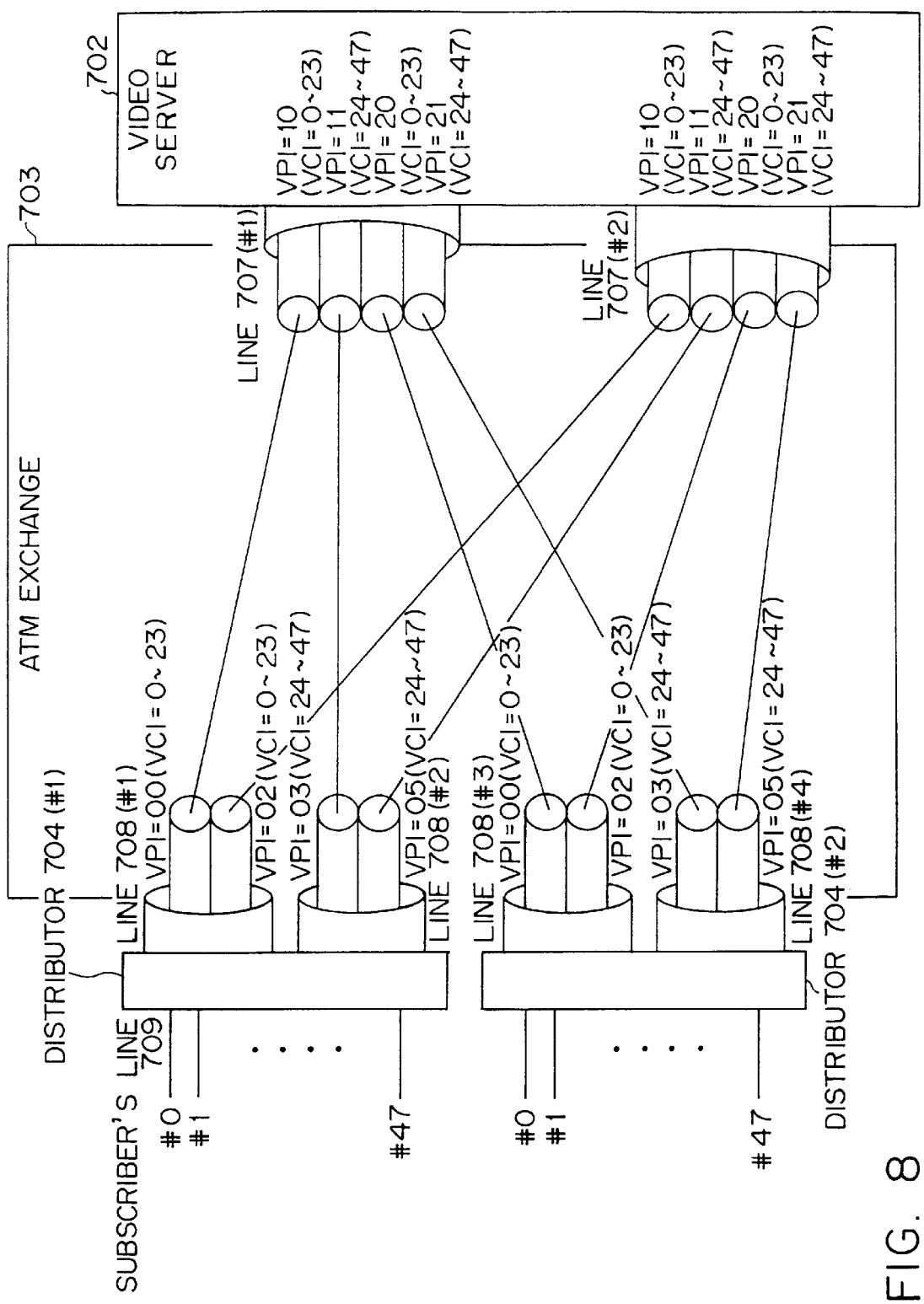
FIG. 8 is a diagram for use in explanation of the operation of the system of the present invention.

In addition, it is a feature related to the present invention that each VPI value can be allocated to both the #1 and #2 lines 707. That is, as shown in FIG. 8, a total of four PVCs is allocated to each of the #1 and #2 lines 707 connected to the video server 702, each of the two lines having equal VPI values.

When receiving a request for video-on-demand service from the subscriber #0 accommodated by the distributor 704 (#1) by way of example, the video server controller 201 of FIG. 5 activates any one of the ATM cell processing units 204 connected to the line 707 (#1) that is not busy. Then, the video server controller 201 refers to the management table 202 having the data structure of FIG. 7A and instructs that ATM cell processing unit to append VPI=10 and VCI=0 to ATM cells it outputs. If, at this point, none of the ATM cell processing units 204 connected to the line 707 (#1) is free, the video server controller 201 makes a search of the ATM cell processing units 204 that are connected to the line 707 (#2) for a free one and then activates the free ATM cell processing unit. Finally, the video server controller 201 instructs that ATM cell processing unit 204 to append VPI=10 and VCI=0 to ATM cells it outputs.

Next, FIG. 7B shows the data structure of a management table in a virtual channel controller (VCC) which, though not shown, is installed in the input section of the ATM exchange 703 of FIG. 1.

When VPI=10 is appended to cells received over an input line, i.e., the #1 or #2 line 707 connected to the video server 702, the VCC replaces VPI=10 with VPI=00 or VPI=02, appends to the beginning of each cell such routing information, called a tag, as permits each cell to be switched independently by a switch in the ATM exchange 703 and then sent over an output line, i.e., the #1 line 708 connected to the #1 distributor 704, and then provides the cell to the switch in the ATM exchange 703.

When VPI=11 is appended to cells received over an input line, i.e., the #1 or #2 line 707 connected to the video server 702, the VCC replaces VPI=11 with VPI=03 or VPI=05, appends to the beginning of each cell such a tag as permits each cell to be switched independently by a switch in the ATM exchange 703 and then sent over an output line, i.e., the #2 line 708 connected to the #1 distributor 704, and then provides the cell to the switch in the ATM exchange 703.

Moreover, when VPI=20 is appended to cells received over an input line, i.e., the #1 or #2 line 707 connected to the video server 702, the VCC replaces VPI=20 with VPI=00 or VPI=02, appends to the beginning of each cell a tag which permits each cell to be switched independently by a switch in the ATM exchange 703 and then sent over an output line, i.e., the #3 line 708 connected to the #2 distributor 704, and then provides the cell to the switch in the ATM exchange 703.

Furthermore, when VPI=21 is appended to cells received over an input line, i.e., the #1 or #2 line 707 connected to the video server 702, the VCC replaces VPI=21 with VPI=03 or VPI=05, appends to the beginning of each cell a tag which permits each cell to be switched independently by a switch in the ATM exchange 703 and then sent over an output line, i.e., the #4 line 708 connected to the #2 distributor 704, and then provides the cell to the switch in the ATM exchange.

That is to say, the ATM exchange 703 connects VPI-defined PVCs on the #1 and #2 lines 707 connected to the video server 702 and VPI-defined PVCs on the #1 to #4 lines 708 connected to the #1 and #2 distributors 704 in the manner shown in FIG. 8.

As described previously, the video server 702 sends cells for a subscriber group over a PVC defined by one VPI on the #1 or #2 line 707. In this case, the cells will be sent over either of two PVCs defined by two VPIs on a single line 708 connected to one distributor 704.

As a specific example, the video server 702 sends cells for a subscriber group comprised of subscribers #0 to #23 that the distributor 704 (#1) accommodates over the VPI=10-defined PVC on the #1 or #2 line 707. The cells will then be sent over either of two PVCs defined by VPI=00 or VPI=02 on the line 708 (#1) connected to the distributor 704 (#1).

Figure 3:
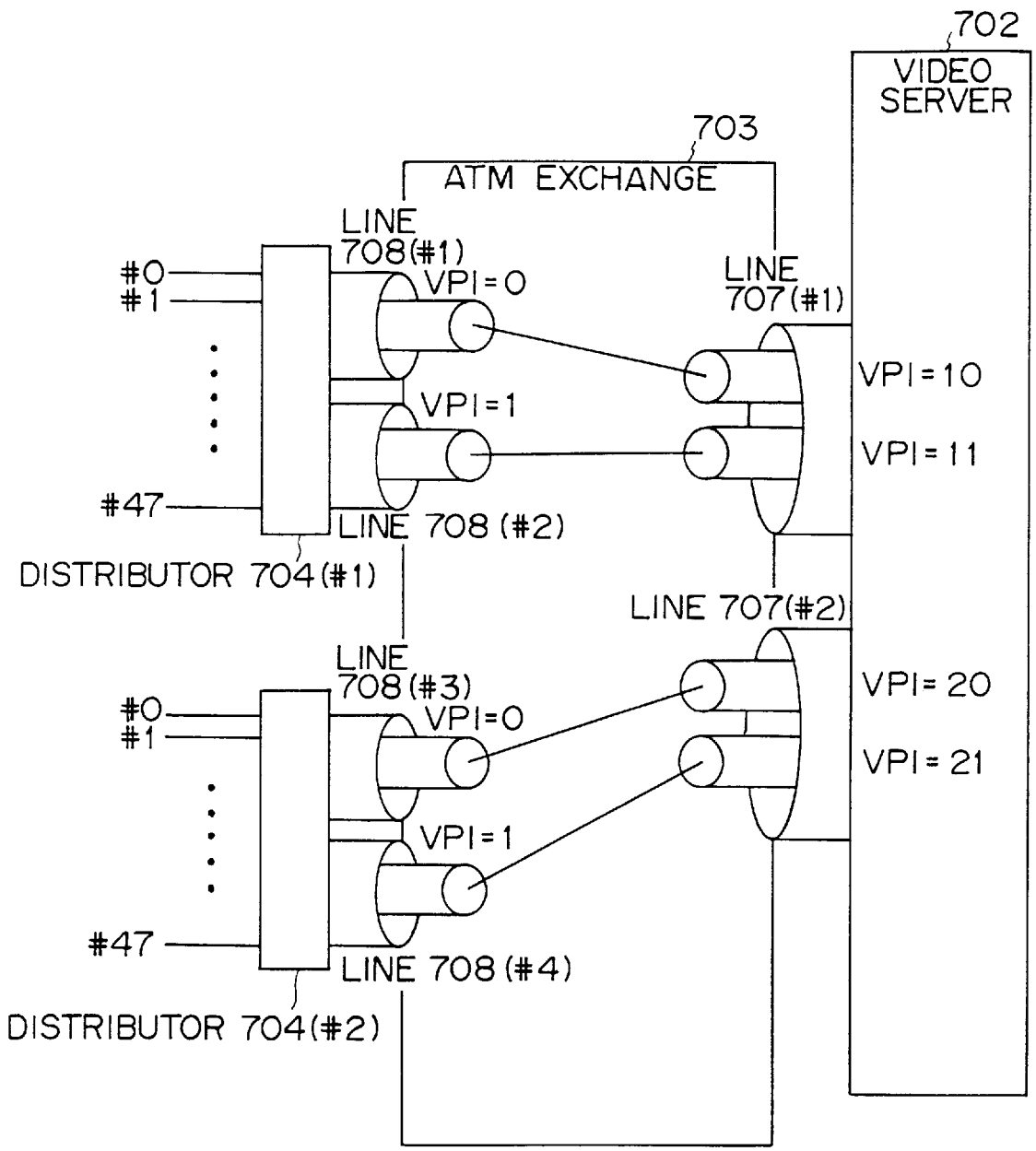

By the ATM exchange 703 connecting PVCs on the line 707 and PVCs on the line 708 in the manner described above, the total number of subscribers allocated to four PVCs on a single line 707 will be 96, which is equal to the total number of subscribers that two distributors 704 accommodates. In the prior art, as shown in FIG. 3, two PVCs are allocated to a single line 707, and the total number of subscribers allocated to them is 48, which is equal to the total number of subscribers that one distributor accommodates. Therefore, the present embodiment achieves a reduction of one half in the deviation from the average percentage of subscribers who may make simultaneous requests for video-on-demand service. This advantage will be described later.

FIG. 7C shows the data structure of the management table 301 in the distributor 704 shown in FIG. 6.

Figure 9:
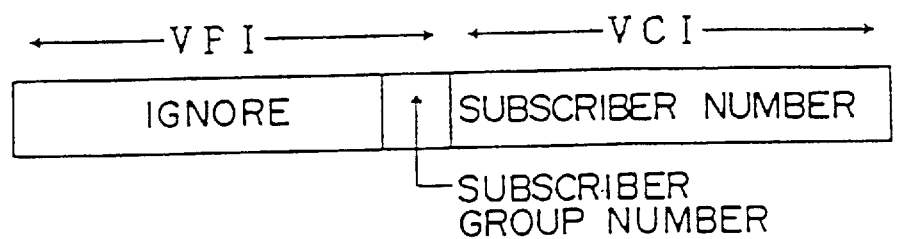
FIG. 9 is a diagram for use in explanation of VPI and VCI in the present invention.

First, the ATM cell processing unit 204 (#1 or #2) in the distributor 704 (#1 or #2) connected to the line 708 (#1 or #3) refers to the management table 301 and, when either VPI=00 or VPI=02 is appended to received cells, recognizes that the cells are directed to the subscriber group comprised of subscribers #0 to #23. Specifically, the ATM cell processing unit 204 (#1 or #2) identifies a subscriber group by only the low-order bit of VPI appended to each cell received as shown in FIG. 9. That is, when the low-order bit is a zero, the ATM cell processing unit 204 (#2) recognizes that the cell is destined for a subscriber group comprised of subscribers #0 to #23. In addition, the ATM cell processing unit 204 (#1) identifies each subscriber in the subscriber group by a VCI value placed in each cell and provides the cell to the TI interface 306 corresponding to the subscriber.

Likewise, the ATM cell processing unit 204 (#2) in the distributor 704 (#2) connected to the line 708 (#2 or #4) refers to the management table 301 and, when either VPI=03 or VPI=05 is appended to received cells, recognizes that the cells are directed to the subscriber group comprised of subscribers #24 to #47. Specifically, when the low-order bit of VPI is a one, the ATM cell processing unit 204 (#2) recognizes that the cell is destined for a subscriber group comprised of subscribers #24 to #47. In addition, the ATM cell addition, the ATM cell processing unit 204 (#2) identifies each subscriber in the subscriber group by a VCI value placed in each cell and provides the cell to the TI interface 306 corresponding to the subscriber.

In this way, the present embodiment implements such a mechanism as permits the video server 702 to send cells for a subscriber group within one distributor 704 over either of the #1 and #2 lines 708 and permits one distributor 704 to receive cells for a subscriber group over either of the #1 and #2 lines 708 accordingly.

Thereby, the total number of subscribers which are allocated to one line 708 connected to the video server 702 can be increased by a factor of two over the prior art. As a result, the present embodiment can reduce the deviation from the average percentage of subscribers who may make simultaneous requests for video-on-demand service to one-half of that in the prior art.

Figure 2:
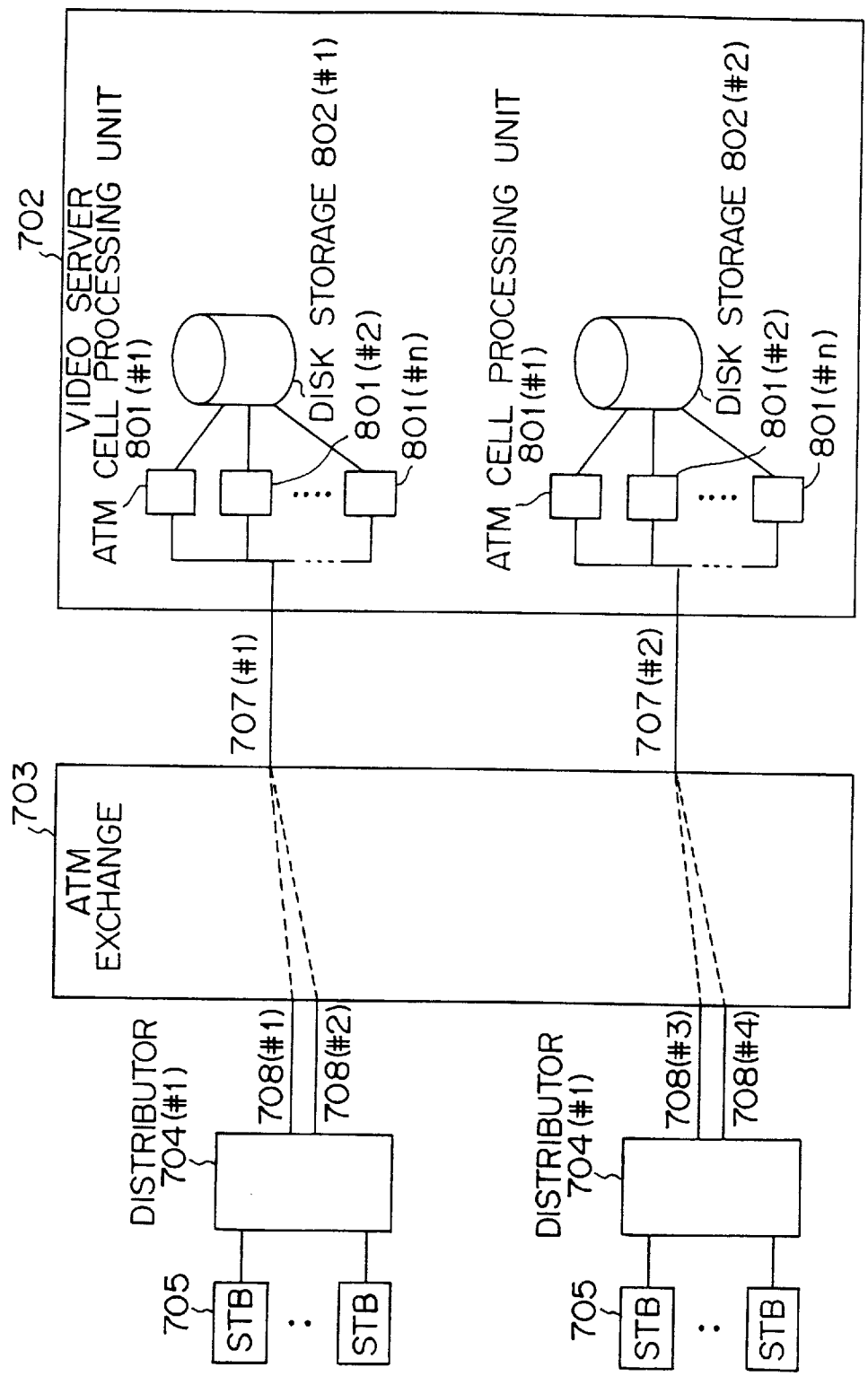
FIGS. 2 and 3 are diagrams for use in explanation of a prior art.

As described previously, in the prior art, the total number of subscribers who are allocated to one line 707 is 48, the average percentage of subscribers who may make simultaneous requests for video-on-demand service is, say, 50%, and the deviation of the average is, say, 10%. In this case, the number of ATM cell processing units 801 (shown in FIG. 2) required for two lines 707 will be $$\{48\times(50\%+10\%)\}\times 2\approx 58$$

In contrast with the prior art, in the present embodiment, the deviation from the average can be set to, say, 5% because the total number of subscribers allocated to one line 707 is 96 (the actual number is 48). Therefore, the number of ATM cell processing units 801 required for two lines 707 can be set to $$\{48\times(50\%+5\%)\}\times 2\approx 53$$

Although the embodiment described above is directed to a video server system which distributes digital image data to subscribers, the present invention may be applied to various media information distribution systems.

What is claimed is:

1. A media server for use with a media information distribution system in which media information output from said media server is distributed to subscribers via an exchange and a distributor connected to said exchange, comprising:

a plurality of server-side lines connecting said media server and said exchange;

a plurality of line interfaces to which each of said server-side lines is connected in a one-to-one correspondence;

management means for managing information relevant to a plurality of server-side paths each of which is allocated to a respective one of said server-side lines for a subscriber group that said distributor accommodates;

means for obtaining a free server-side path of said server-side paths corresponding to said subscriber group which is identified by said information managed by said management means; and in-server path control means for, by using said free server-side path, sending media information bound for said subscriber group to said line interface connected to said server-side line to which said free server-side path is allocated.

2. An exchange for use with a media information distribution system in which media information output from a media server is distributed to subscribers via said exchange and a distributor connected to said exchange, comprising:

a plurality of server-side lines connecting said media server and said exchange;

a plurality of distributor-side lines connecting said distributor and said exchange;

management means for managing information relevant to a plurality of distributor-side paths, which are allocated to said distributor-side lines for a subscriber group that said distributor accommodates, corresponding to a plurality of server-side paths each of which is allocated to a respective one of said server-side lines for said subscriber group;

an in-exchange path control means for connecting said server-side paths to said distributor-side path corresponding to said server-side paths which are identified by said information managed by said management means; and means for receiving and transmitting data in accordance with a control of said in-exchange path control means.

3. An exchange for use with a media information distribution system in which media information output from a media server is distributed to subscribers via said exchange and a distributor connected to said exchange, comprising:

a plurality of server-side lines connecting said media server and said exchange;

a plurality of distributor-side lines connecting said distributor and said exchange;

management means for managing information relevant to a plurality of distributor-side paths, which are allocated to said distributor-side lines for a subscriber group that said distributor accomodates, corresponding to a plurality of server-side paths each of which is allocated to a respective one of said server-side lines for said subscriber group;

an in-exchange path control means for connecting said server-side paths to a plurality of said distributor-side paths corresponding to said server-side paths which are identified by said information managed by said management means; and means for receiving and transmitting data in accordance with a control of said in-exchange path control means.

4. A distributor for use with a media information distribution system in which media information output from media server is distributed to subscribers via an exchange and said distributor connected to said exchange, comprising:

a plurality of distributor-side lines connecting said distributor and said exchange;

management means for managing information relevant to a plurality of distributor-side paths allocated to said distributor-side lines for a subscriber group that said distributor accommodates; an in-distributor path control means for distributing media information received using each of a plurality of said distributors-side paths to said subscriber group which is identified by said information managed by said management means; and means for receiving and transmitting data in accordance with a control of said in-distributor path control means.

5. The distributor according to claim 4, wherein said distributor-side paths for said subscriber group are identified by virtual path identifiers each of which is appended to said media information and has an equal low-order bit value.

6. A media information distribution service system in which media information output from a media server is distributed to subscribers via an exchange and a distributor connected to said exchange comprising:

in-server path control management means for managing information relevant to a plurality of server-side paths each of which is allocated to a respective one of a plurality of server-side lines connecting said media server and said exchange for a subscriber group that said distributor accommodates;

in-server path control means for, by using a free server-side path of said server-side paths corresponding to said subscriber group which is identified by said information managed by said in-server path control management means, sending media information bound for said subscriber group to a line interface connected to a server-side line to which said free server-side path is allocated;

in-exchange path control management means for managing information relevant to a plurality of distributor-side paths, which are allocated to distributor-side lines connecting said distributor and said exchange for said subscriber group, corresponding to said server-side paths;

in-exchange path control means for connecting each of said server-side paths to a respective one of a plurality of said distributor-side paths corresponding to said server-side paths which are identified by said information managed by said in-exchange path control management means;

in-distributor path control management means for managing information relevant to a plurality of distributor-side paths allocated to said distributor-side lines for said subscriber group; and in-distributor path control means for distributing said media information received using each of said distributor-side paths to said subscriber group which is identified by said information managed by said in-distributor path control management means.

7. The media information distribution service system according to claim 6, wherein said distributor-side paths for said subscriber group are identified by virtual path identifiers each of which is appended to said media information and has an equal low-order bit value.

8. A media information distribution service method for distributing media information output from a media server to subscribers via an exchange and a distributor connected to said exchange, comprising the steps of:

managing in-server path control information relevant to a plurality of server-side paths each of which is allocated to a respective one of a plurality of server-side lines connecting said media server and said exchange for a subscriber group that said distributor accommodates;

sending, in said media server, media information bound for said subscriber group to a line interface connected to a server-side line allocated a free server-side path of said server-side paths allocated to said server-side lines which are identified by said in-server path control information;

managing in-exchange path control information relevant to a plurality of distributor-side paths, which are allocated to distributor-side lines connecting said distributor and said exchange for said subscriber group, corresponding to said server-side paths;

connecting, in said exchange, each of said server-side paths to a respective one of said distributor-side paths corresponding to said server-side paths which are identified by said in-exchange path control information;

managing in-distributor path control information relevant to a plurality of distributor-side paths allocated to said distributor-side lines for said subscriber group; and distributing in said distributor, said media information received using said distributor-side paths to said subscriber group which are identified by said in-distributor path control information.

9. The media information distribution service method according to claim 8, wherein said distributor-side paths for said subscriber group are identified by virtual path identifiers each of which is appended to said media information and has an equal low-order bit value.

10. A media server for use with a media information distribution system in which media information output from said media server is distributed to subscribers via an exchange and a distributor connected to said exchange comprising:

a management table unit managing information relevant to a plurality of server-side paths each of which is allocated to a respective one of a plurality of server-side lines connecting said media server and said exchange for a subscriber group that said distributor accommodates, and a video server control unit sending media information bound for said subscriber group to a line interface connected to a server-side line to which a free server-side path is allocated by using said free server-side path of said server-side paths corresponding to said subscriber group which is identified by said information managed by said management table unit.

11. The media server according to claim 10 further comprising:

ATM cell processing units sending data from a disk storage to an OC-3 processing unit, and wherein said management table unit manages information for a virtual path identifier, a virtual channel identifier, a line, and subscribers, and said ATM cell processing units send data from said disk storage to said OC-3 processing unit by dividing into plural ATM cells and storing with designated virtual path identifiers and virtual channel identifiers according to information from said video server control unit.

12. The media server according to claim 11, wherein said virtual path identifier is allocated to a subscriber group composed of subscribers that said distributor accommodates, each of said subscribers within each distributor is identified by said virtual channel identifier, and each virtual path identifier value can be allocated to each of lines connected to said media server.

13. The media server according to claim 12, wherein if there is any one of said ATM cell processing units connected to a line that is not busy, said video server control unit activates one of said ATM cell processing units, refers to said management table, and instructs an ATM processing unit to append said virtual path identifier and said virtual channel identifier to said one of ATM processing units, and if there is not any one of said ATM cell processing units connected to a line that is not busy, said video server control unit makes a search of said ATM cell processing units that are connected to a line that is not busy, activates a free ATM cell processing unit, and instructs an ATM processing unit to append said virtual path identifier and said virtual channel identifier to said one of said ATM processing units.

14. An exchange for use with a media information distribution system in which media information output from a media server is distributed to subscribers via said exchange and a distributor connected to said exchange comprising:

a management table unit managing information relevant to a plurality of distributor-side paths, which are allocated to distributor-side lines connecting said distributor and said exchange for a subscriber group that said distributor accommodates, corresponding to a plurality of server-side paths each of which is allocated to a respective one of a plurality of server-side lines connecting said media server and said exchange for said subscriber group, and a virtual channel control unit connecting server-side paths to said distributor-side path corresponding to said server-side paths which are identified by said information managed by said management table unit.

15. The exchange according to claim 14, wherein said management table unit manages information for virtual path identifier and lines.

16. The exchange according to claim 15, wherein said virtual channel control unit changes each virtual path identifier for a distributor, and adds routing information by which each cell can be sent on a line connected to said distributor by switching automatically in said exchange.

17. An exchange for use with a media information distribution system in which media information output from a media server is distributed to subscribers via said exchange and a distributor connected to said exchange comprising:

a management table unit managing information relevant to a plurality of distributor-side paths, which are allocated to distributor-side lines connecting said distributor and said exchange for a subscriber group that said distributor accommodates, corresponding to a plurality of server-side paths each of which is allocated to respective one of a plurality of server-side lines connecting said media server and said exchange for said subscriber group, and virtual channel control unit connecting said server-side paths to a plurality of said distributor-side paths corresponding to said server-side paths which are identified by said information managed by said management table unit.

18. A distributor for use with a media information distribution system in which media information output from a media server is distributed to subscribers via an exchange and said distributor connected to said exchange comprising:

a management table unit managing information relevant to a plurality of distributor-side paths allocated to a plurality of distributor-side lines connecting said distributor and said exchange for a subscriber group that said distributor accommodates, and an in-distributor path control unit distributing media information received using each of a plurality of said distributor-side paths to said subscriber group which is identified by said information managed by said management table unit.

19. The distributor as defined in claim 18 further comprising:

ATM cell processing units outputting data in each ATM cell to one of interface units, and wherein said management table unit manages information for a virtual path identifier, a virtual channel identifier a line, and subscribers, and said ATM cell processing units outputs data in said each ATM cell to one of said interface units based on said virtual path identifier and said virtual channel identifier stored in said ATM cell by referring to said management table.

20. The distributor according to claim 19, wherein said ATM cell processing units recognize a specified subscriber group for specific virtual path identifiers of a received cell by referring to said management table by judging the least significant bit of said virtual path identifier included in a received cell.

21. A media information distribution service system in which media information output from a media server is distributed to subscribers via an exchange and a distributor connected to said exchange comprising:

an in-server path control management table unit managing information relevant to a plurality of server-side paths each of which is allocated to a respective one of a plurality of server-side lines connecting said media server and said exchange for a subscriber group that said distributor accommodates;

an in-server path control unit sending media information bound for said subscriber group to a line interface connected to a server-side line to which a free server-side path is allocated by using said free server-side path of said server-side paths corresponding to said subscriber group which is identified by said information managed by said in-server path control management table unit;

an in-exchange path control management table unit managing information relevant to a plurality of distributor-side paths, which are allocated to distributor-side lines connecting said distributor and said exchange for said subscriber group, corresponding to a plurality of server-side paths each of which is allocated to a respective one of said server-side lines for said subscriber group;

an in-exchange path control unit connecting said server-side paths to a respective one of a plurality of said distributor-side paths corresponding to said server-side paths which are identified by said information managed by said in-exchange path control management table unit;

an in-distributor path control management table unit managing information relevant to a plurality of distributor-side paths allocated to a plurality of said distributor-side lines; and an in-distributor path control unit distributing said media information received using each of a plurality of said distributor-side paths to said subscriber group, which is identified by said information managed by said in-distributor path control management table unit.

* * * * *